L. N. VINCENT.
AUTOMATIC RELIEF VALVE.
APPLICATION FILED AUG. 7, 1917.

1,291,292.

Patented Jan. 14, 1919.
3 SHEETS—SHEET 1.

Louis N. Vincent, Inventor

By Blackwood Bros.
Attorneys.

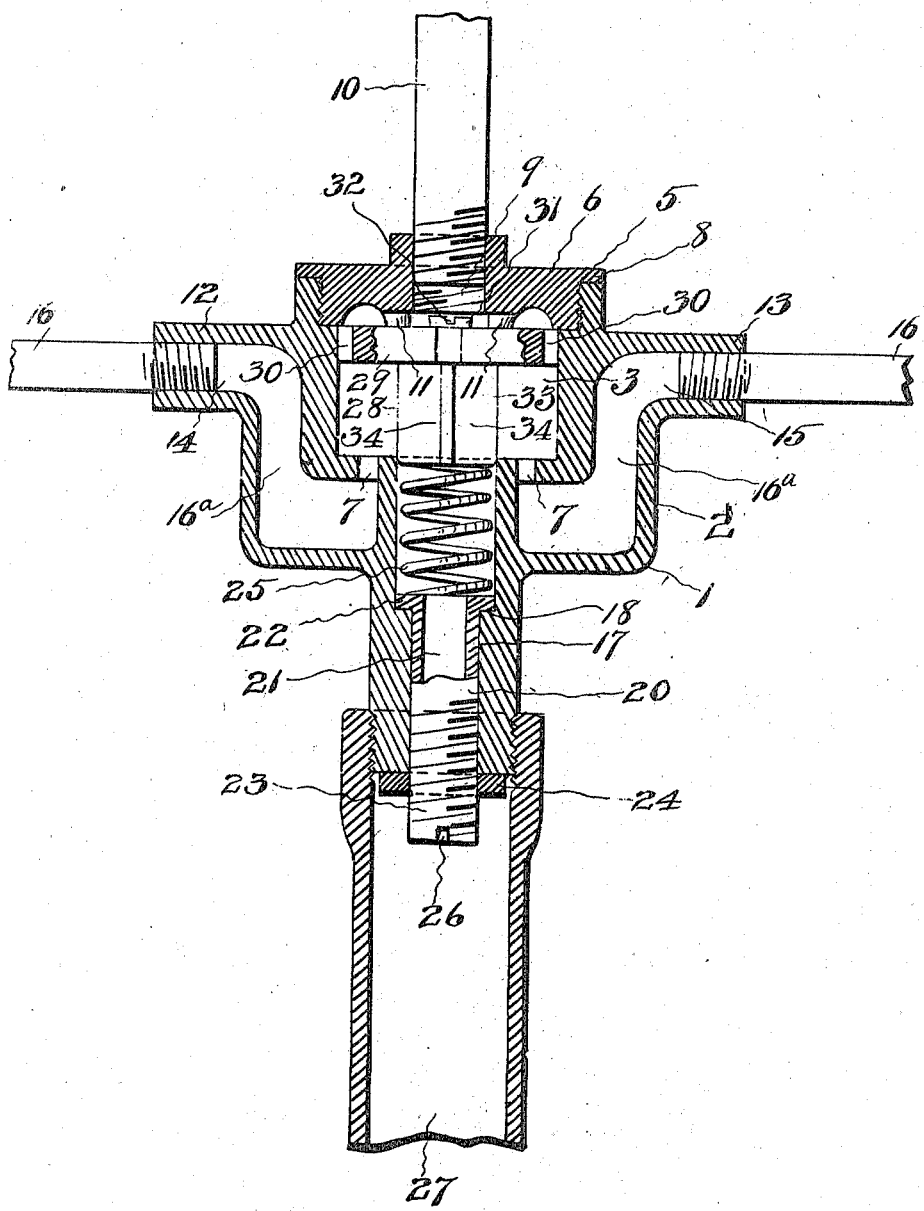

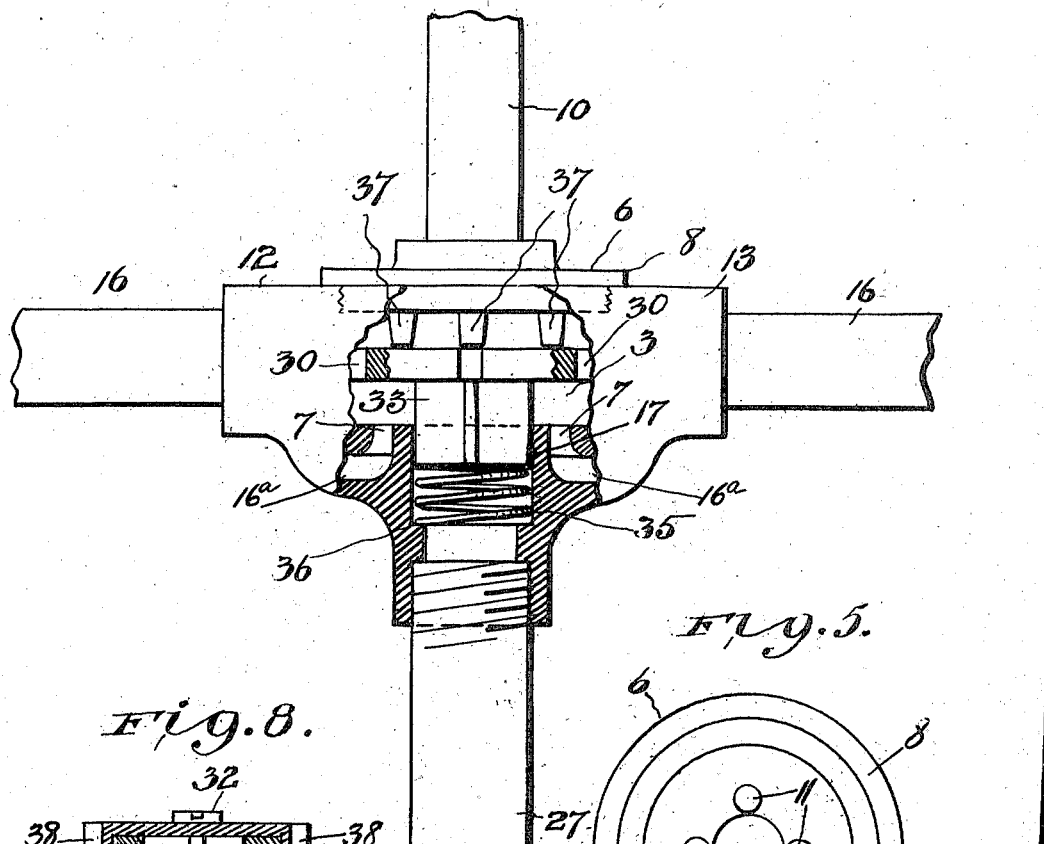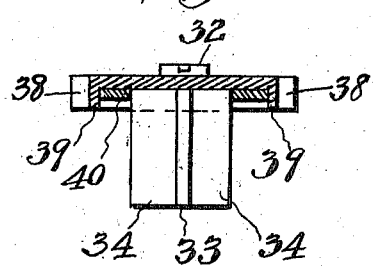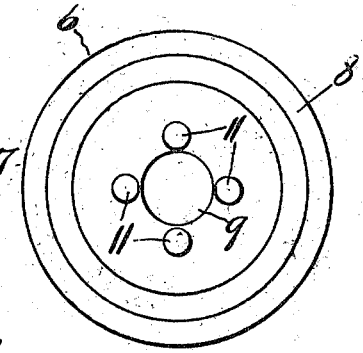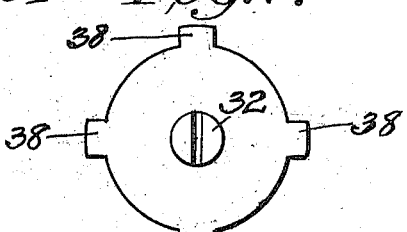

UNITED STATES PATENT OFFICE.

LOUIS N. VINCENT, OF SEATTLE, WASHINGTON.

AUTOMATIC RELIEF-VALVE.

1,291,292.

Specification of Letters Patent. Patented Jan. 14, 1919.

Application filed August 7, 1917. Serial No. 184,858.

*To all whom it may concern:*

Be it known that I, LOUIS N. VINCENT, residing at Seattle, in the county of King and State of Washington, a citizen of the United States, have invented certain new and useful Improvements in Automatic Relief-Valves; and I do hereby declare the following to be a full, clear, and exact description of the invention, such as will enable others skilled in the art to which it pertains to make and use the same.

My invention relates to improvements in automatic relief valves, and more particularly to a relief valve designed for use in connection with the cylinders of a locomotive and other engines, steam pipes and the like.

The object of the invention is to provide a valve with means for automatically relieving the cylinder or cylinders with which it is operatively connected by discharging or drawing off the water of condensation with a minimum loss or waste of steam.

A further object is to provide a valve which is automatically closed by steam pressure and automatically opens when the steam pressure is released.

A further object is to provide a valve which is adapted to be connected to a plurality of cylinders, steam pipes, &c., and which will automatically drain or relieve them all simultaneously.

A further object is to provide a valve with means capable of acting quickly when subjected to pressure and adapted to automatically adjust or accommodate itself to different steam pressures.

A further object is to provide a valve which is not set at any given or predetermined pressure and the operation of which is controlled at all times by the normal steam pressure in use without regard to any variations in pressure that may occur.

A further object is to provide a valve in which the normal or working pressure on the top of the same is overcome by the pressure created by the water of condensation, from the engine cylinders which is forced against the under side of the valve and causes it to move upward and thereby relieves the excessive pressure by discharging the water of condensation.

A further object is to provide a valve adapted to be substituted for the well known relief valve which is set for a certain specified predetermined pressure.

A still further object is to provide a valve which is simple, inexpensive and durable in construction, has a minimum number of parts and is convenient and effective in operation.

The invention consists in the several features and in the construction, combination and arrangement of features as more fully hereinafter described and claimed.

Referring to the drawings:—

Fig. 2 is a central vertical section.

Fig. 5 is a bottom plan view of the cap or closure.

Fig. 6 is a section of modified form of valve in which the adjusting means for the valve is dispensed with.

Figs. 7 and 8 show a modified form of reciprocatable valve.

Figure 1:
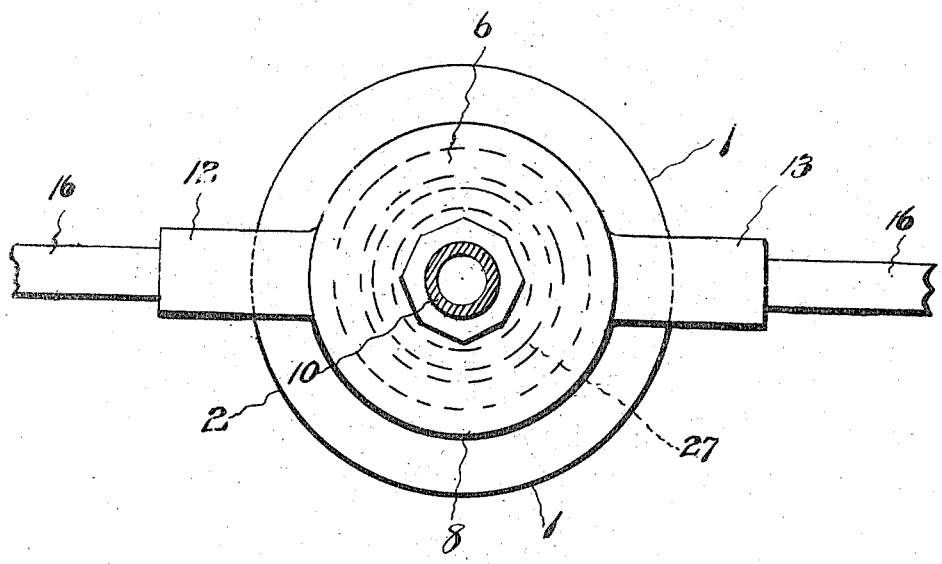
Figure 1 is a top plan view.
Figure 3:
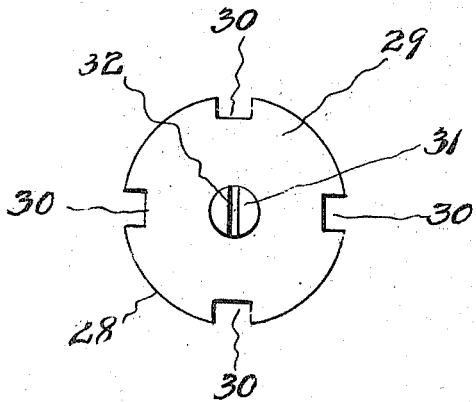
Fig. 3 is a top plan view of the reciprocatable valve.
Figure 4:
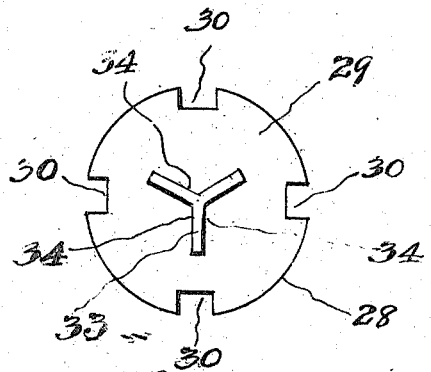
Fig. 4 is a bottom plan view of the reciprocatable valve.

In the drawings in which similar reference characters denote similar parts throughout the several views, 1 represents the automatic relief valve having a casing 2 with a valve chamber 3 the upper portion of which is provided with interior screwthreads 4, with which the screwthreads 5 of the cap or closure 6 engage, and the lower portion being provided with an annular port or opening 7.

The cap or closure 6 comprises a lateral flange 8, an interior screwthreaded inlet 9 adapted to receive a high pressure inlet pipe 10 connected with a steam cylinder, steam pipe or the like and a plurality of depending lugs 11 for the purpose of spacing the reciprocatable valve hereinafter described therefrom.

Laterally extending projections 12 and 13 are provided on the walls of the casing which have inlet ports or apertures 14 and 15, respectively, and each adapted to be connected with a steam cylinder, steam pipe or the like by means of a pipe 16, and each inlet aperture 14 and 15 communicates with the annular port or opening 7 of the chamber 3 by means of a curved port 16$^a$.

By means of the plurality of inlets 10, 16 and 15 a plurality of steam cylinders, steam pipes and the like may be simultaneously relieved of excessive pressure by allowing the water of condensation to be discharged through the inlet apertures into the valve and thence out through the discharge port and discharge pipe of the valve.

The central portion of the casing 2 is provided with an elongated chamber or bore 17 having interior screwthreads and an interior shoulder 18 is provided about midway of the length of the chamber 17.

A sleeve 20 is mounted in the lower part of the chamber or bore 17 and is provided with a discharge opening 21 therethrough, an annular flange 22 at its upper end, which seats on the shoulder 18 of the chamber 17, and its lower end is provided with exterior screwthreads 23 with which a set-nut 24 engages for the purpose of locking the sleeve 20 after it has been adjusted to the required height to cause the spring 25 in the upper portion of the chamber 3 to have the desired tension.

In order to adjust the sleeve 20 to the desired point slots 26 are provided in its lower edge adapted for the reception of a suitable tool for turning the same.

An exhaust or discharge pipe 27 for water of condensation is connected to the lower end of the casing 2.

The chamber 3 is provided with a reciprocatory valve 28 having a circular head or disk 29, which operatively fits the interior of the chamber, with a plurality of ports or openings 30 in its periphery, an upwardly extending projection 31 with a cross slot 32, a stem 33 depending from the lower face of the head or disk and mounted in the chamber 17 and provided with a plurality of exhaust channels or grooves 34 extending from end to end thereof.

The spiral spring 25 serves to normally retain the head of disk 29 of the valve against lugs 11 on the lower surface of the cap or closure 6 and thus holds the valve in its open position until steam pressure from the high pressure inlet 9 forces the valve downward and causes it to assume its closed position against the bottom of the chamber 2 closing the annular port or opening 7 and ports 30.

In the modified form of my invention shown in Fig. 6 the adjustable means for the spiral spring 25 is dispensed with and the spiral spring 35 is used which is seated on a shoulder 36 in the chamber 17 and tapering lugs 37 are provided depending from the cap or closure 6.

In the modification of the reciprocatory valve shown in Figs. 7 and 8 a plurality of lugs 38 are used instead of the ports or openings in its periphery and a depending flange 39 is provided and a gasket 40 to be used in connection with said flange to make a tight joint with the top of the chamber 2.

In operation, steam under pressure passes through the high pressure inlet pipe 10 and inlet passage 9 into chamber 3 and forces the valve 28 down upon the seat at the bottom of the chamber 3 compressing the spiral spring 25 and closing the annular port or opening 7 and ports 30 and when the valve is released from steam pressure the spring 25 expands and forces the valve upward against the lugs of the cap or closure whereupon all the condensed steam and water from the steam cylinder or plurality of steam cylinders or the like passes through the plurality of ports 30 in the valve 28 and the annular port or opening 7 into the chamber 3, then through the channels in the stem of the valve, chamber 18 and sleeve 20 to the discharge or exhaust pipe 27.

I do not wish to be understood as limiting myself to the specific details of construction and arrangement as herein described and illustrated, as it is manifest that variations and modifications may be made in the features of construction and arrangement in the adaptation of the device to the various conditions of use without departing from the spirit and scope of my invention and improvements. I therefore reserve the right to all such variations and modifications as properly fall within the scope of my invention and the terms of the following claims.

What I claim is:—

1. An automatic relief valve, comprising a casing provided with a valve chamber integral therewith, a removable closure at the outer portion of said chamber, a normally open reciprocatory valve in said chamber provided with a stem with channels, means for spacing the valve from said removable closure in order to allow the passage of water or steam, a plurality of inlets communicating with said valve chamber by means of ports therein, means for retaining the valve in its normal position, and an exhaust passage communicating with the valve chamber through the channels of the valve stem.

2. An automatic relief valve, comprising a casing provided with a valve chamber integral therewith and having ports in its lower portion, a removable closure at the outer portion of said chamber, a normally open reciprocatory valve in said chamber provided with a plurality of ports in its periphery and a stem with channels, means depending from said removable closure spacing the valve therefrom in order to allow the passage of water or steam, a plurality of inlets communicating with said valve chamber by means of ports therein, means for retaining the valve in its normal position, and an exhaust passage communicating with the valve chamber through the channels of the valve stem.

In testimony whereof I have affixed my signature.

LOUIS N. VINCENT.